United States Patent
Hurtevent et al.

(10) Patent No.: US 10,472,556 B2
(45) Date of Patent: Nov. 12, 2019

(54) NANO-INHIBITORS

(71) Applicants: TOTAL SA, Courbevoie (FR); UNIVERSITE CLAUDE BERNARD LYON 1, Villeurbanne (FR); CENTRE NATIONAL DE LA RECHERCHE SCIENTIFIQUE-CNRS-, Paris (FR)

(72) Inventors: Christian Hurtevent, Pau (FR); Salima Baraka-Lokmane, Pau (FR); John-Richard Ordonez-Varela, Lons (FR); Olivier Tillement, Fontaines Saint-Martin (FR); Arthur Marais, Lochrist (FR); Albert Moussaron, Villeurbanne (FR)

(73) Assignees: TOTAL SA, Courbevoie (FR); UNIVERSITE CLAUDE BERNARD LYON 1, Veilleurbanne (FR); CENTRE NATIONAL DE LA RECHERCHE SCIENTIFIQUE (CNRS), Paris (FR)

(*) Notice: Subject to any disclaimer, the term of this patent is extended or adjusted under 35 U.S.C. 154(b) by 185 days.

(21) Appl. No.: 15/536,523

(22) PCT Filed: Dec. 15, 2014

(86) PCT No.: PCT/FR2014/053342
§ 371 (c)(1),
(2) Date: Jun. 15, 2017

(87) PCT Pub. No.: WO2016/097492
PCT Pub. Date: Jun. 23, 2016

(65) Prior Publication Data
US 2017/0349810 A1    Dec. 7, 2017

(51) Int. Cl.
| | |
|---|---|
| C09K 8/532 | (2006.01) |
| C09K 8/035 | (2006.01) |
| C09K 8/528 | (2006.01) |
| B01J 13/14 | (2006.01) |
| B82Y 99/00 | (2011.01) |
| C01F 17/00 | (2006.01) |
| C08L 83/08 | (2006.01) |

(52) U.S. Cl.
CPC .............. *C09K 8/532* (2013.01); *B01J 13/14* (2013.01); *B82Y 99/00* (2013.01); *C01F 17/0043* (2013.01); *C08L 83/08* (2013.01); *C09K 8/035* (2013.01); *C09K 8/528* (2013.01); *C09K 2208/10* (2013.01)

(58) Field of Classification Search
CPC ................................. C09K 8/532; C08L 83/08
See application file for complete search history.

(56) References Cited

U.S. PATENT DOCUMENTS

| | | | |
|---|---|---|---|
| 2008/0269083 A1 | 10/2008 | Argillier et al. | |
| 2010/0310865 A1* | 12/2010 | Kumar | B82Y 30/00 428/352 |
| 2012/0015852 A1 | 1/2012 | Quintero et al. | |
| 2013/0195766 A1 | 8/2013 | Lux et al. | |
| 2014/0323363 A1 | 10/2014 | Perriat et al. | |

FOREIGN PATENT DOCUMENTS

| | | |
|---|---|---|
| FR | 2 881 787 A1 | 8/2006 |
| FR | 2 976 825 A1 | 12/2012 |
| WO | 2011/135101 A2 | 11/2011 |

OTHER PUBLICATIONS

Ghorbani et al., "Using Nanoscale Dispersed Particles to Assist in the Retention of Polyphosphinocarboxylic Acid (PPCA) Scale Inhibitor on Rock," SPE International, SPE 156200, 2012, pp. 1-8.
Yan et al., "Boehmite Based Sulphonated Polymer Nanoparticles with Improved Squeeze Performance for Deepwater Scale Control," Offshore Technology Conference, OTC 24252, 2013, pp. 1-12.
Zhang et al., "Silica-templated Synthesis of Novel Zinc-DTPMP Nanoparticles, Their Transport in Carbonate and Sandstone Porous Media and Scale Inhibition," SPE International, SPE 130639, 2010, pp. 1-17.
Bazzi et al., "Synthesis and properties of europium-based phosphors on the nanometer scale: $Eu_2O_3$, $Gd_2O_3$:Eu, and $Y_2O_3$:Eu," Journal of Colloid and Interface Science, 2004, vol. 273, pp. 191-197.
Bridot et al., "Hybrid Gadolinium Oxide Nanoparticles: Multimodal Contrast Agents for in Vivo Imaging," J. Am. Chem. Soc., 2007, vol. 129, No. 16, pp. 5076-5084.
Ou et al., "Delocalization of 4f Electrons in Gadolinium Oxide on the Nanometer Scale," J. Phys. Chem. C 2009, vol. 113, No. 10, pp. 4038-4041.
Louis et al., "Nanosized Hybrid Particles with Double Luminescence for Biological Labeling," Chem. Mater., 2005, vol. 17, No. 7, pp. 1673-1682.
Kan et al., "Adsorption and precipitation of an aminoalkylphosphonate onto calcite," Journal of Colloid and Interface Science, 2005, vol. 281, pp. 275-284.
May 19, 2015 International Search Report issued in International Patent Application No. PCT/FR2014/053342.

\* cited by examiner

*Primary Examiner* — Kuo Liang Peng
(74) *Attorney, Agent, or Firm* — Oliff PLC

(57) ABSTRACT

Novel hybrid nanoparticles, useful for inhibiting or slowing down the formation of sulfur deposits or minerals in a well during the extraction of gas or oil. Specifically, the nanoparticles each include (i) a polyorganosiloxane (POS) matrix; and, optionally as a coating over a lanthanide oxide core, (iii) at least one polymeric scale inhibitor during the extraction of gas or oil. The invention also relates to the method for obtaining the nano-inhibitors and the application of same.

15 Claims, 5 Drawing Sheets

A

B

Inhibitor concentration in mg/L

Porous volume having circulated

NANO-INHIBITORS

TECHNICAL FIELD

The invention relates to a novel formulation with nanoparticles of mineral deposit inhibitors. These solutions of inhibitors are used to prevent or at least slow down the formation of mineral deposits in a well during the extraction of gas or oil, in particular deposits of sulphides, sulphates or metal carbonates.

The invention also relates to the method for obtaining them as well as applications thereof.

TECHNOLOGICAL BACKGROUND

When operating oil and gas fields, oil recovery can be improved by injecting water within the deposit being operated, this via an injection well and in such a way as to push the oil of the deposit out of the ground, by at least one other well called a production well. The interaction of the injected water with the deposit containing the gas, the oil and groundwater can result in the formation of chemical species that may cause malfunctions of the installations. Barium sulphate deposits are particularly to be feared. Other types of deposits for example calcium carbonate or zinc and lead sulphides, can be formed in the presence of injection water as well as in the absence of it. The latter are in particular likely to be formed in operating conditions with high pressure and a high temperature or during the putting into contact of the brine that is injected in order to extract the oil or the gas with hydrogen sulphide or the ions contained in the deposit. The production of deposit or aquifer water simultaneously with the oil or gas can result in the same phenomena. These mineral deposits are able to obstruct the flow channels in the formation, pollute the duct and the surface equipment and block pumping systems and safety valves. More generally, mineral deposits or corrosion phenomena can appear in various operating conditions.

A common solution for eliminating these mineral deposits consisted in carrying out repeated acid washes. In addition to the problem of their short acting time, these treatments are not without risk for the equipment or for personnel, in particular in conditions of high pressure and high temperature.

To remedy this problem, it is possible to inhibit the formation of these deposits by continuous injection of inhibitors at the bottom of the well when the installations are in place. The so-called "squeeze" injection technique is an alternative to continuous injection.

The latter consists in the injection of a large quantity of product into the oil deposit while production is stopped. The deposit inhibitor once injected within the deposit must be adsorbed on the rock in order to be progressively released afterwards when production is resumed, this in order to prevent the formation of deposits over a long period of time, during the production of deposit water.

Molecular inhibitors of mineral deposits conventionally used in prior art as "squeeze" injection include phosphonates, vinyl sulphonate polymers (PVS), sulphonated polycarboxylic acids (SPCA) as well as polyphosphinocarboxylic acids (PPCA) which may be sulphonated (Kan and al. 2005, *Journal of Colloid and Interface Science* 281:275-284). These inhibitors are however considered to not be very heat stable, and some, such as phosphonates are troublesome for use due to the risks for the environment that they have. It has however been observed that conventional mineral deposit inhibitors were not effective for use in conditions of high pressure and high temperature. It has also been noted that polymeric inhibitors are not effective or are hardly effective for use as "squeeze" injection.

Chao and al (2013, OTC 24252) suggested using a formulation of inhibiting agents of the sulphonated polycarboxylic acid (SPCA) type coupled with alumina nanoparticles for "squeeze" injections. Zhang and al (2010, SPE 130639) have however also described silica-based nanoparticles comprising the Zinc-phosphonate association. Ghorbani and al (2012, SPE 156200) have moreover described the use of polyphosphinocarboxylic acid (PPCA) on a carbon-based nanoparticle. The synthesis of these nanoparticles is however difficult to implement and is costly, as each nanoparticle contains very little inhibitor with respect to the elements that structure nanoparticles proposed in prior art.

There is still therefore a need for a compound that makes it possible to inhibit or to slow done the formation of mineral deposits or of sulphides, which is stable at a high temperature and high pressure and/or that can be effective for a squeeze injection. It would furthermore be desirable for this compound to be able to be released in a prolonged manner, and for it to be simple to produce and/or inexpensive. Finally, it would be advantageous for these compounds to be biodegradable quickly and of low toxicity for the environment.

The inventors have demonstrated that these needs could be satisfied by using novel nanoparticles comprising (i) a polyorganosiloxane (POS) matrix; possibly as coating of a lanthanide oxide core, and (ii) at least one polymeric deposit inhibitor.

SUMMARY OF THE INVENTION

This invention has for object nanoparticles characterised in that they each comprise (i) a polyorganosiloxane (POS) matrix; possibly as coating of a lanthanide oxide core, (ii) at least one polymeric deposit inhibitor.

The invention also has for object a method for obtaining these nanoparticles, and the uses thereof for inhibiting or slowing down the formation of mineral or sulphur deposits in a well during the extraction of oil or gas.

Advantageously, the inventors have indeed shown that the nanoparticles according to this invention, also called "Nanoinhibitors" hereinafter, have an effectiveness that is at least comparable to conventional molecular inhibitors, but have remarkable resistance to degradation at high temperature. In addition, their submicron size and their hydrophilic nature make it possible to consider effective interaction with the rock for a use as "squeeze", in particular in conditions of high temperature and/or high pressure.

DETAILED DESCRIPTION OF EMBODIMENTS

The nanoparticles according to this invention, or "Nanoinhibitors", are characterised in that they each comprise (i) a polyorganosiloxane (POS) matrix; possibly as coating of a lanthanide oxide core, (ii) at least one polymeric deposit inhibitor.

These Nanoinhibitors are able to inhibit or slow down the formation of mineral deposits during the extraction of gas or of oil, due to the presence of at least one polymeric deposit inhibitor within thereof, associated with the polyorganosiloxane matrix, preferably by non-covalent bonds. The structure of the nanoparticles according to the invention, or Nanoinhibitors, is as such comprised of a central portion or core, primarily with a polyorganosiloxane base and, where applicable, comprising a lanthanide oxide core, and a coating of the core, formed primarily of polymeric deposit inhibitors, connected to the core preferably by non-covalent interactions, in particular electrostatic interactions.

In a preferred embodiment, the mass of the deposit inhibitors represents more than 80% of the total mass of each nanoparticle, preferably more than 90%, and even more than 95%, 96%, 97%, 98% and even more than 99%.

The Core with a Polyorganosiloxane Base

The core with a polyorganosiloxane (POS) can be synthesized using conventional synthetic techniques known to those skilled in the art. The so-called "sol-gel" process is for example commonly used for such structures. In a particular embodiment, the core is a hybrid nanoparticle of the core/shell type, with a lanthanide oxide core around which is generated a polyorganosiloxane coating. In a specific embodiment the nanoparticle core with a lanthanide oxide base is entirely dissolved and the nanoparticle no longer has any lanthanide oxide crystals, such as described for example in application WO 2011/135101.

In terms of the invention, the lanthanides are rare earth metals chosen from the series of element numbers 57 (lanthanum) to 71 (lutetium). Added to this list is yttrium, which is not actually considered to be a lanthanide but which is a rare earth of comparable chemistry, also making this element useable in the framework of this invention. In a preferred embodiment, gadolinium oxide will be used. The matrix with a polyorganosiloxane base that comprises the core is formed mostly of compounds comprising the elements Si, C, H, O and N, based on silicones. The polyorganosiloxane matrix can advantageously be functionalised by —R groups, preferably by covalence with a silane Si—R bond base on the surface and coming from hydrophilic compounds selected from amine derivatives, in particular from the group consisting of: aminopropyl, N-(2-aminoethyl-3-aminopropyl; Bis(2-hydroxyethyl)-3-Aminopropyl; N-propyl-N, N, N-trimethylamonium; N-Propul-N, N, N-tri-n-butyl ammonium; 11-amino-undecyl, N-(2-aminoethyl)-11 amino-undecyl.

In a preferred embodiment, the polyorganosiloxane matrix comprises functions with positive charges, and preferably free amino functions. In a preferred embodiment the polyorganosiloxane matrix comprises a mol/mol [free amino group]/[silica atom] ratio of at least 10% and preferably of at least 30%. The amine functions or more generally, functions with a positive charge, present in the core of the nanoparticle allow for the interaction of the core with the polymeric deposit inhibitors, in general of a negative charge.

In another embodiment, the core with a polyorganosiloxane base is directly generated from polysiloxane cores, for example, from 3-Aminopropyl)triethoxysilane (APTES) and tetraethyl orthosilicate (TEOS) as described in Example. In particular, at least 10% of APTES is reacted with TEOS in order to form the core with a polyorganosiloxane base.

In general, the core+polyorganosiloxane matrix unit that forms the core of the Nanoinhibitors does not exceed a mean volume diameter of 10 nm, preferably the mean diameter is less than 5 nm for the core+polyorganosiloxane matrix unit.

The distribution of the size of the nanoparticles is for example measured using a commercial granulometer, such as a Malvem Zêta sizer Nano-S granulometer based on PCS (Photon Correlation Spectroscopy). This distribution is characterised by a mean diameter and a polydispersity index.

In terms of the invention, "mean diameter" means the harmonic mean of the diameters of the particles. The polydispersity index refers to the width of the distribution in size derived from the analysis of the cumulants. These two characteristics are described in ISO 13321: 1996.

In another embodiment, the core with a polyorganosiloxane base is primarily comprised of polyorganosiloxanes, and where applicable of gadolinium oxide. In particular, in a more specific embodiment, the core is free of aluminas, zirconias, aluminates, aluminophosphates and/or metal oxides.

The Core Coating Comprised of Polymeric Deposit Inhibitors

The Nanoinhibitors according to the invention are characterised in that they comprise a coating with a base mostly of polymeric mineral deposit or sulphur deposit inhibitors. These inhibitors preferably have negative charges that allow for stable interaction by non-covalent bonds at the core of the nanoparticle comprising the polyorganosiloxane matrix, which is positively charged in normal conditions of use.

The term "mineral deposit inhibitor" means a compound that is able to prevent or slow down the formation (i.e. the nucleation and/or the growth) of mineral salt crystals chosen in particular from: calcium carbonate, calcium sulphate, barium sulphate, strontium sulphate, zinc, lead and iron sulphides and mixtures thereof.

The mineral deposit inhibitors that can be used according to the invention can be chosen from the polymeric deposit inhibitors with a negative charge, preferably from polymers or copolymers that contain at least one of the following functions:
 carboxylic polyacids,
 sulphonic acid polymers,
 phosphates or phosphonates,
 polyphosphinocarboxylic acids,
 amide functions.
They are more specifically selected from:
 polyphosphates, such as sodium tripolyphosphate (STPP), sodium hexametaphosphate (SHMP),
 organophosphonates, such as amino tri(methylene phosphonic) acid or AMP, 1-hydroxyethylidene-1,1-diphosphonic acid or HEDP, ethylenediamine tetra (methylene phosphonic) acid or EDTMP, hexamethylenediamine tetra acid (methylene phosphonic acid) or HMTMP, diethylenetriamine penta (methylene phosphonic) acid or DETMP, hydroxyethyl-amino-di (methylenephosphonic) acid (HEMPA),
 polycarboxylic acids such as 2-phosphonobutane 1,2,4-tricarboxylic or PBTC, poly (acrylic acid) or PAA, poly (methacrylic acid) or PMAA, poly (maleic acid) or PMA,
 polymers comprising a sulphonic acid function, such as copolymers of styrene sulphonic acid and (poly) carboxylic acid, in particular styrene sulphonic acid and maleic acid copolymers, copolymers of styrene sulphonic and (poly) amido-amine, vinyl sulphonate homopolymers and copolymers, in particular vinyl sulphonate, styrene and maleic anhydride copolymers, alkyldiphenylether sulphonates and acrylamidomethylpropane sulphonic acid (AMPS), maleic acid and acrylic acid copolymers,
 polyphosphinocarboxylic acid (PPCA) optionally sulphonated.

The term "sulphur deposit inhibitor" means a compound able to reduce or slow down the formation of sulphur deposits.

In particular in a specific embodiment, a polymeric sulphur deposit inhibitor is a copolymer comprised solely of units that comprise (and preferably constituted of) a styrene sulphonic acid unit optionally neutralised and units containing (and preferably constituted of) a (poly)carboxylic acid unit optionally neutralised or at least one (poly)amido-amine unit. The term "(poly)carboxylic acid unit" means a unit carrying one or several carboxylic acid functions. This unit is advantageously obtained from an unsaturated monomer carrying at least one, and preferably two, carboxylic acid functions, chosen for example from maleic acid, fumaric acid, itaconic acid, citraconic acid, cis-2,3,6-tetrahydrophthalic anhydride, with maleic acid being preferred. These carboxylic acid units can be neutralised using sodium, potassium or ammonium salts, preferably sodium salts. The (poly)amido-amine unit can be obtained by reaction of all or a portion of the carboxylic acid functions with a compound, preferably a polymer, carrying at least two primary or secondary amine functions, which can be chosen in particular from: polyamines such as DETA (diethylenetriamine), TETA (triethylenetetramine), TEPA (tetraethylenepentamine), triamine dihexylene and polyethyleneimine (PEI); silicone polymers, in particular polydimethylsiloxanes functionalised with amine groups; chitosans; polypeptides and proteins, preferably DETA and PEI.

In a more specific embodiment, the molar percentage, in the copolymer according to the invention, of units containing a styrenesulphonic acid unit optionally neutralised is between 10 and 90%, preferably between 25 and 75% and, better, between 50 and 70%. This copolymer can contain at least one other unit that is chemically separate from those mentioned hereinabove and which can for example represent at most 20% mol and preferably at most 10% mol, with respect to the total number of moles of monomer units in said copolymer. This other unit can be chosen in particular from (meth)acrylamides, esters of (meth)acrylic acid, vinyl acetate, styrene and vinyltoluene.

In another specific embodiment, the polymeric inhibitor used in the nanoparticles according to the invention advantageously satisfies the following formula:

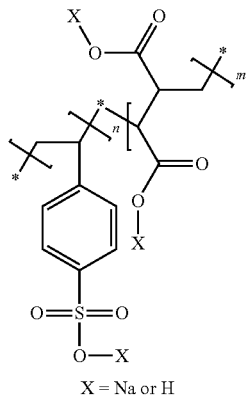

X = Na or H where $m/(m+n)=0.1-0.9$ and $n/(m+n)=0.9-0.1$, preferably $m/(m+n)=0.25-0.75$ and $n/(m+n)=0.75-0.25$, and more preferentially $m/(m+n)=0.3-0.5$ and $n/(m+n)=0.5-0.7$.

According to a more specific embodiment of the invention, some or all carboxylic acid functions of the copolymer are substituted with resulting amido-amine functions, as previously indicated, of the reaction of these carboxylic acid functions with at least two primary or secondary amine functions carried by a compound which is reacted with the units containing at least one (poly)carboxylic acid unit of the copolymer. It has indeed been observed that these copolymers had improved properties of inhibiting the formation of sulphur deposits. It is thought that these copolymers make it possible to obtain a prolonged inhibitor effect, by the progressive hydrolysis of the amide functions, but also a more effective action, insofar as the lone pair of the nitrogen atom of the amine functions not having been involved in the amide bonds is useful for complexing the surface sites of the particles of sulphide, of zinc and of lead. These copolymers with amido-amine functions also limit the interactions between the (poly)carboxylic acid units and barium sulphate or calcium carbonate deposits, for example, which can make it possible to prevent the copolymer from reacting exclusively with these deposits which tend, in certain conditions, to form before the sulphide deposits.

This specific copolymer can be obtained according to conventional methods of radical polymerization in aqueous or hydroalcoholic means and at acidic pH. It is also commercially available from ALDRICH or AKZO NOBEL.

In another specific embodiment, the Nanoinhibitors are characterised in that they comprise a polymeric deposit inhibitor chosen from copolymers of styrene sulphonic acid and of (poly) carboxylic acid, in particular styrene sulphonic acid and maleic acid copolymers, and copolymers of styrene sulphonic acid and (poly) amidoamine.

In a specific embodiment the Nanoinhibitors are characterised in that they comprise a polymeric deposit inhibitor with a molar mass of at least 10 kDa, preferably greater than 20 kDa.

Typically, the mean lower diameter of the Nanoinhibitors can range up to 2 µm, for example between 20 and 500 nm, but preferably between 20 and 200 nm.

In addition to the polymeric deposit inhibitors such as described hereinabove, Nanoinhibitors can comprise other deposit inhibitors, and in particular phosphonates.

Method for Obtaining Nanoinhibitors

The invention also relates to a method for obtaining Nanoinhibitors such as hereinabove. This method is characterised in that is comprises the following steps:

a. optionally synthesising a core with a lanthanide oxide base, for example a core of gadolinium oxide, b. coating the cores of the step (a) with polyorganosiloxane (POS) or preparing a nanoparticle polyorganosiloxane, consisting primarily in implementing a sol/gel technique of hydrolysis-condensation of silicic and alkoxysilane species, in the presence of a base or an acid;

c. overcoating the nanoparticles obtained in step (b) consisting primarily in bringing these coated cores or polyorganosiloxane nanoparticles of the step (b) in contact with a solution of polymeric deposit inhibitors in the presence preferably of an aqueous or alcoholic solvent, for example polyethers, in particular polyethylene glycol;

d. optionally purification of the nanoparticles, preferably by tangential filtration, dialysis and/or by precipitation/washing;

e. optionally dissolving the cores of lanthanides oxides of the nanoparticles of the step (b) or overcoated nanoparticles of the step (c) consisting primarily in putting them in the presence of a pH modifying agent and/or of a chelator able to complex all or a portion of the lanthanide cations, in such a way that the diameter of the nanoparticles without the overcoating is reduced to a value between 1 and 20 nm, preferably between 1 and 10 nm;

f. the steps (c), (d), and (e) are able to be carried out in a different order or at the same time.

In a specific embodiment the steps (a) and (b) consist more precisely in forming a core-shell nanoparticle with a lanthanide oxide core (for example via modified polyol) and a shell of polysiloxane (for example via sol/gel), this object for example has a size less than 10 nm (even less than 5 nm). Un lanthanide oxide core of a size less than 10 nm can be developed as described in an example or by one of the methods described in the following publications: P. Perriat et al, *J. Coll Int. Sci.* 2004, 273, 191; O. Tillement and al. J Am Chem Soc 2007, 129, 5076 and P. Perriat and al., 1. *Phys. Chem. C,* 2009, 113, 4038. These cores can be coated with a polysiloxane layer by following for example a protocol described in the following publications: C. Louis and al., Chem Mat. 2005, 17, 1673 and O. Tillement and al., J. Am. Chem. Soc., 2007, 129, 5076.

In the step c), the nanoparticles obtained in the step b) are brought into contact with a sufficient amount of a solution of polymeric deposit inhibitors under conditions that are able to allow for coating (or overcoating) nanoparticles with the polymeric deposit inhibitors as described in an example. An adding at a relatively slow speed and good agitation is advised at this level.

The step d), optional, consists in separating the Nanoinhibitors from the synthesis residue for example by a method of dialysis or tangential filtration, over a membrane having suitable pore size.

The step e), also optional, makes it possible to obtain nanoparticles for which the lanthanide oxide core is destroyed by dissolution (for example by modifying the pH or by providing complexing molecules in the solution, as described in application WO 2011/135101).

Products Derived from Nanoinhibitors

The invention also has for object
a suspension of Nanoinhibitors such as described hereinabove,
a suspension of Nanoinhibitors such as obtained by the method described hereinabove,
an injection liquid in order to inhibit or slow down the formation of deposits during the gas or oil operation, comprising Nanoinhibitors such as defined hereinabove and/or, Nanoinhibitors such as obtained by the method described hereinabove, and/or the aforementioned suspension of Nanoinhibitors.

Applications

The Nanoinhibitors according to the invention or their derivatives are useful for inhibiting or slowing the formation of sulphur and/or minerals deposits during the extraction of gas or oil.

Because of their good heat resistance, Nanoinhibitors or their derivatives can be used in particular in oil wells operating at high pressure, i.e. at more than 10 MPa, for example from 20 to 150 MPa, and at high temperature, i.e. from 150 to 250° C., for example from 200 to 230° C.

They are also particularly suitable for use in the form of an injection of said nanoparticles in squeeze.

In an embodiment, the invention provides a method for inhibiting or slowing down the formation of mineral deposits or sulphur deposits, during extraction of gas or oil, said method comprising injecting, into a wellbore, a subterranean formation, or an oil or gas well, a fluid containing said Nanoinhibitors.

Nanoinhibitors can be injected into the well in the form of an additive in an injection fluid. This fluid may contain from 5 to 100,000 ppm of Nanoinhibitor described above. For continuous injections, it is advisable to choose contents of about 10 to 1000 ppm, for periodic injections, in particular of the squeeze type, it is advisable to use concentrations higher than 1000 ppm.

Alternatively, the Nanoinhibitors described hereinabove can be injected into the well as "squeeze", i.e. according to a method of rinsing the well with sea water, then injecting into the well a fluid containing this Nanoinhibitor and introducing again sea water into the well to disperse the polymer in the reservoir and allow it to adsorb onto the underground rock formations. During this treatment, oil extraction operations are interrupted and, when they will be resumed, the polymeric inhibitor will be gradually released from rock formations to prevent or slow down the formation of sulphide deposits. In this alternative, the injected fluid may contain about 10% by weight of the Nanoinhibitors described hereinabove.

In any case, the fluid conveying the Nanoinhibitors can furthermore contain other additives such as corrosion inhibitors, paraffin inhibitors, surfactants or demulsifying agents, dispersing agents, in particular asphaltene dispersants, foaming agents or defoaming agents, biocides, oxygen scavengers, chelating agents such as EDTA and DTPA, and mixtures thereof.

The invention will be better understood in light of the following non-limiting examples, which are purely illustrative and are not intended to limit the scope of this invention which is defined by the annexed claims.

EXAMPLES

Figure 1:
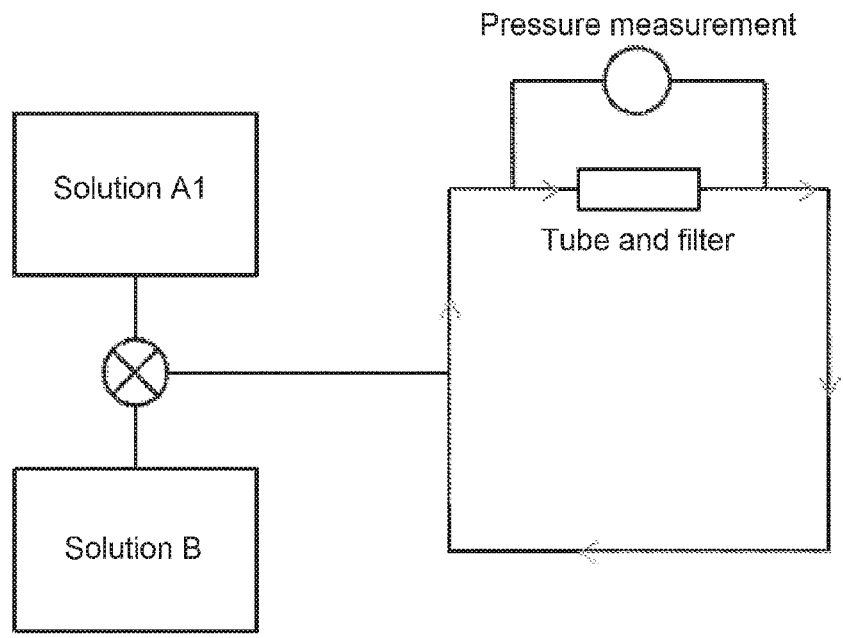
FIG. 1 is a diagram showing the Blocking test device.

Example 1: Preparation of Small Gadolinium Oxide Cores Coated with a Layer of Polysiloxane (or PC4Si)

A colloid of $Gd_2O_3$ is prepared in a 10 L temperature controlled reactor and equipped with a mechanical stirrer by dissolving 167.3 g of gadolinium chloride hexahydrate in 3 L of diethylene glycol. The mixture is then heated to 140° C. and stirred at about 300 rpm for 2 to 3 hours, until complete dissolution of the crystals.

Once all gadolinium chloride crystals are dissolved, is added dropwise 44.55 mL of 10 M NaOH solution. The mixture is stirred at about 250 rpm at 180° C. for 5 hours. The same mixture is then allowed to cool to room temperature (20 to 30° C.) under stirring at 200 rpm for at least 12 hours.

Measuring the average size of the cores is carried out by laser granulometry directly in DEG without dilution. The mean diameter in volume is 1.5±0.5 nm with less than 5% of particles beyond 5 nm.

Around these particles, a layer of functionalized polysiloxane is synthesized by sol-gel. To do this, two solutions $S_1$ and $S_2$ are prepared as follows:

For the solution $S_1$, a homogenized mixture of APTES and TEOS is prepared under an inert atmosphere as follows: in a 2 L bottle, mix 1.6 L of DEG, 51.42 mL of TEOS and 80.61 mL APTES measured using graduated cylinders with a suitable volume.

As for the solution $S_2$, mix 190 ml of DEG; 43.1 mL ultra-pure water and 6.94 mL of triethylamine (TEA) in a 250-mL bottle. The volume of DEG is measured with a graduated cylinder of suitable volume and the volumes of TEA and ultra-pure water are removed using an Eppendorf pipette of suitable volume. Homogenize the solution.

The colloid is then heated to 40° C. under stirring at 250 rpm. A 40° C., all of the solution $S_1$ is added which is (1732 mL), and this using a peristaltic pump over a duration of 96 h. This corresponds to a flow rate of 300 µL/min. One hour after the start of the adding of the solution $S_1$ 184.3 mL of $S_2$ is added using a peristaltic pump over a duration of 96 h. This corresponds to a flow rate of 32 µL/min.

Once the two solutions have been added, the global solution formed is kept under stirring at about 150 rpm at 40° C. for 72 h.

The solution is brought to ambient temperature (10 to 30° C.) and allowed to sit for at least 12 h.

At the end of these operations, the measurement of the average size of the particles is carried out via laser granulometry directly in the DEG, without dilution. The mean diameter in volume is 3.0±1.0 nm with less than 5% of the particles beyond 8 nm.

Example 2: Preparation of an Inhibiting Solution of Sodium Salt of Poly (Acid 4-Styreenesulphonic-Co-Maleic Acid) (or Fl1)

The polymer Fl1, purchased from Sigma Aldrich, (CAS: 68037-40-1; [CH2CH(C6H4SO3R)]$_x$[CH(CO2R)CH(CO2R)]$_y$, R=H or Na), has a molecular weight of about 20 kDa. The polymer has a ratio of three styrene sulphonic acid functions to one maleic acid function.

One hundred grams of Fl1 are weighed in a 1 L bottle. 1 L of ultra-pure water is then added and a stirring is maintained until total dissolution.

Example 3: Preparation of a Solution of Nano Inhibitors of PC4Si and of Sodium Salt of Poly (Acid 4-Styrenesulphonic-Co-Maleic Acid) (or Fl1-PC4Si)

In a 100 mL bottle is set to react 50 mL of the solution of Fl1, obtained according to the protocol of example 2, with 2.5 mL of the of PC4Si, obtained according to the example 1, and 47.5 mL of diethylene glycol. The whole is maintained under stirring let for 24 h.

Measuring the average particle size is then performed by laser granulometry after a dilution of ten times in ultra-pure water. The mean diameter in volume is 55 nm±5.0 nm.

Example 4: Preparation of Solutions of Nano Inhibitors of PC4Si and of Sodium Salt of Poly (Acid 4-Styrenesulphonic-Co-Maleic Acid) (or Fl1-PC4Si) at Different Concentrations in PC4Si In six 100 mL bottles are set to react 50 mL of the solution of Fl1, obtained according to the example 2, with respectively, 0 mL, 0.1 mL, 0.5 mL, 1 mL, 5 mL and 10 mL of the solution of PC4Si obtained according to the example 1 and respectively, 50 mL, 49.9 ml, 49.5 mL, 49 mL, 45 mL and 40 mL of diethylene glycol and let to stir 24 h.

Measuring the average particle size is then performed by laser granulometry after dilution by a factor of ten in ultra-pure water. The mean diameters in volume are respectively 60 nm±10 nm, 65 nm±10 nm, 65 nm±10 nm, 15 nm±1 nm, 10 nm±1 nm and 1 nm±0.05 nm.

Example 5: Preparation of an Inhibiting Solution of Polymer of Acid 1,3-benzenedicarboxylic with 2,2-dimethyl-1,3-propanediol, 2,5-furandione, Hexanedioic Acid, 1,3-isobenzofurandione, 2,2'-oxybis (ethanol) and 1,2-propanediol (IDOS 150 or BelasolS50)

The polymer, called IDOS150 or BelasolS50, is supplied by R.E.P. Recherche Exploitation Produits (CAS: 110152-61-9).

100 grams of IDOS150 are weighed in a 1 L volumetric flask. The volume is then adjusted to 1 L with ultra-pure water and the solution homogenised.

Example 6: Preparation of Inhibiting Solutions of IDOS150-PC4Si at Different Concentrations in PC4Si In four 100 mL bottles are set to react 40 mL of ultra-pure water, 5 mL of the solution IDOS150, obtained according to the example 5, with respectively, 0 mL, 0.05 mL, 0.1 mL and 0.25 mL of the solution of PC4Si according to the example 1, and respectively, 5 mL, 4.95 mL, 4.9 mL and 4.75 mL of diethylene glycol. The solutions are then placed under stirring for 24 h.

Measuring the average particle size is then performed by laser granulometry after dilution by a factor of ten in ultra-pure water. The mean diameters in volume are respectively 450 nm±10 nm, 350 nm±10 nm, 400 nm±10 nm and 300 nm 10 nm.

Example 7: Preparation of an Inhibiting Solution of Terpolymer of Allyl Sodium Sulphonate, of Maleic Anhydride and of 1-Hydroxyethane 1,1-diphophosphonic Acid (TP8106G)

The polymer, called TP8106G, is supplied by Clariant.

50 grams of TP8106G are weighed in a 1 L volumetric flask. The volume is then adjusted to 1 L with ultra-pure water. The solution is homogenised.

Example 8: Preparation of a Solution of Nano Inhibitors of TP8106G-PC4Si

In a 100 mL bottle are set to react 50 mL of the solution of TP8106G, obtained according to the example 7, with 0.5 mL of the solution of PC4Si, according to the example 1, and 49.5 mL of diethylene glycol and let under stirring for 24 h.

Measurement of average particle size is performed by laser granulometry after dilution by a factor of ten in ultra-pure water. The mean diameter in volume is 30 nm±5.0 nm.

Example 9: Evaluation of the Inhibiting Effect of Zns by the Tube Blocking Test of the Formulations FL1 and FL1-PC4S Evaluation with the Polymer FL1 Alone Two saline solutions containing respectively metal cations (A1) and the element sulphur (B1) are mixed in equal proportions (see table 1 for the chemical composition of the solutions). The mixture then passes into a tube in which a deposit of metal salts is likely to be formed). The tube is provided with a filter whereon the deposit is installed with priority which makes the circulation of the fluid difficult. The formation of a deposit is as such accompanied by an increase in the differential pressure between the ends of the tube. The inhibitor is introduced via the solution A1 to which it is added in variable concentrations. A later analysis of the filter by the techniques of SEM and EDX makes it possible to obtain precise information on the quantity and the nature of the deposits formed.

The device used is shown in the annexed FIG. 1.

TABLE 1

Composition of the solutions used for the Tube Blocking Test

| ion | Solution A1 (mg/L) | Solution B1 (mg/L) |
|---|---|---|
| Na | 63310 | 117576 |
| Ca | 37318 | 0 |
| Mg | 511 | 0 |
| K | 0 | 0 |
| Ba | 0 | 0 |
| Sr | 0 | 0 |
| $SO_4$ | 0 | 0 |
| Fe | 0 | 0 |
| Pb | 0 | 0 |
| Zn | 300 | 0 |
| S | 0 | 10 |

The inhibitor FL1 is added to the solution A1 in variable quantities in such a way as to obtain the concentrations of the table 2 within the tube. As mentioned hereinabove these solutions are co-injected with the solution B1 (proportions 50/50 in volume) via a tube made of a specific alloy (Ni72Cr16Fr8) with an outer diameter of 1 mm and an inner diameter of 0.8 mm. Once they are intimately mixed, the two solutions pass through a filter with a porosity of 7 μm. The solutions are injected with a flow rate of 10 ml/min for both of them. A measurement of the pressure differential that exists on either side of the filter is taken over a duration of one hour. The tests are carried out at a temperature of 125° C. and under a pressure of 45 bars. The results obtained are presented in the Table 2 hereinbelow.

TABLE 2

Results of the Tubes blocking tests

| effective concentration in the tube (mg/L) | increase in pressure over one hour (psi) | deposits observed |
|---|---|---|
| bare filter | N/A | none |
| FL1 | | |
| 0 | 3.3 | large quantity of ZnS |
| 5 | 1.2 | low quantity of ZnS |
| 10 | 1 | traces ZnS |
| 30 | 0 | traces of ZnS |

Evaluation with the Polymer FL1-PC4Si

Two saline solutions containing respectively metal cations (A2) and the element sulphur (B2) are mixed in equal proportions (see table 3 for the chemical composition of the solutions). The mixture then passes into a tube in which a deposit of metal salts is likely to be formed). The tube is provided with a filter whereon the deposit is installed with priority which makes the circulation of the fluid difficult. The formation of a deposit is as such accompanied by an increase in the differential pressure between the ends of the tube. The inhibitor is introduced via the solution A2 to which it is added in variable concentrations. A later analysis of the filter by the techniques of SEM and EDX makes it possible to obtain precise information on the quantity and the nature of the deposits formed.

TABLE 3

Composition of the solutions used for the Tube Blocking Test

| ion | Solution A2 (mg/L) | Solution B2 (mg/L) |
|---|---|---|
| Na | 29,505 | 29,500 |
| Ca | 7,223 | 0 |
| Mg | 511 | 0 |
| K | 0 | 0 |
| Ba | 0 | 0 |
| Sr | 0 | 0 |
| $SO_4$ | 0 | 0 |
| Fe | 0 | 0 |
| Pb | 0 | 0 |
| Zn | 200 | 300 |
| S | 0 | 10 |
| $HCO_3$ | 0 | 0 |
| Cl | 55.5 | 45.4 |

The inhibitor FL1-PC4Si is added to the solution A2 in variable quantities in such a way as to obtain the concentrations of the table 2 within the tube. As mentioned hereinabove these solutions are co-injected with the solution B2 (proportions 50/50 in volume) via a tube made of a specific alloy (Ni72Cr16Fr8) with an outer diameter of 1 mm and an inner diameter of 0.8 mm. Once they are intimately mixed, the two solutions pass through a filter with a porosity of 7 μm. The solutions are injected with a flow rate of 10 ml/min for both of them. A measurement of the pressure differential that exists on either side of the filter is taken over a duration of one hour. The tests are carried out at a temperature of 125° C. and under a pressure of 45 bars. The results obtained are presented in the Table 4 hereinbelow.

TABLE 4

Results of the Tubes blocking tests

| effective concentration in the tube (mg/L) | increase in pressure over one hour (psi) | deposits observed |
|---|---|---|
| bare filter | N/A | none |
| FL1-PC4Si | | |
| 0 | 1.6 | large quantity of ZnS |
| 3 | 0.2 | low quantity of Zns |
| 5 | 0.2 | low quantity of Zns |
| 10 | 0.2 | traces of ZnS |

The results show an effectiveness which appears to be substantially equal in terms of inhibiting of the two formulations (with and without nanoparticles PC4Si).

Example 10: Evaluation of the Thermal Ageing of the Inhibiting Solutions

Evaluation with the Polymer FL1

A volume close to 70 mL of FL1, wherein diazote has been bubbled beforehand, is placed under a pressure of diazote of 1000 psi. The temperature is then raised until reaching 225° C. Such anaerobic conditions are maintained for 5 days.

No significant increase in pressure was able to be measured during the 5 days of testing as what would have been expected in the case of a degradation. An increase in the pH of 3 units is observed. The colour of the solution moreover remains unchanged. An analysis by CPV of the product before and after ageing does not show any significant difference (or any disappearance or appearance of peaks).

Evaluation with the Polymer FL1-PC4Si

A volume close to 70 mL of FL1-PC4Si, wherein diazote has bubbled beforehand, is placed under a pressure of diazote of 1000 psi. The temperature is then raised until reaching 225° C. Such anaerobic conditions are maintained for 5 days.

No significant increase in pressure was able to be measured during the 5 days of testing as what would have been expected in the case of a degradation. A decrease in the pH of 3 units is however observed as well as a darkening of the solution. An analysis by CPV of the product before and after ageing does not show any significant difference (or any disappearance or appearance of peaks).

Example 11: Evaluation of the Inhibiting Effect by the Tube Blocking Test after Thermal Ageing Two saline solutions containing respectively metal cations (A2) and the element sulphur (B2) are mixed in equal proportions (see table 5 for the chemical composition of the solutions). The mixture then passes into a tube in which a deposit of metal salts is likely to be formed). The tube is provided with a filter whereon the deposit is installed with priority which makes the circulation of the fluid difficult. The formation of a deposit is as such accompanied by an increase in the differential pressure between the ends of the tube. The inhibitor is introduced via the solution A2 to which it is added in variable concentrations. A later analysis of the filter by the techniques of SEM and EDX makes it possible to obtain precise information on the quantity and the nature of the deposits formed.

The device used is shown in the annexed FIG. 1.

TABLE 5

Composition of the solutions used for the Tube Blocking Test

| ion | Solution A2 (mg/L) | Solution B2 (mg/L) |
|---|---|---|
| Na | 29505 | 29500 |
| Ca | 7223 | 0 |
| Mg | 511 | 0 |
| K | 0 | 0 |
| Ba | 0 | 0 |
| Sr | 0 | 0 |
| $SO_4$ | 0 | 0 |
| Fe | 0 | 0 |
| Pb | 0 | 0 |
| Zn | 200 | 300 |
| S | 0 | 10 |
| $HCO_3$ | 0 | 0 |
| Cl | 55.5 | 45.4 |

The inhibitor FL1-PC4Si (which has or has not been subjected to thermal ageing) is added to the solution A2 in variable quantities in such a way as to obtain in the end the concentrations of the table 6. These solutions are then co-injected with the solution B (proportions 50/50 in volume) via a tube made of a specific alloy (Ni72Cr16Fr8) with an outer diameter of 1 mm and an inner diameter of 0.8 mm. Once they are intimately mixed the two solutions pass through a filter with a porosity of 7 μm. The solutions are injected with a flow rate of 10 ml/min for both of them. A measurement of the pressure differential that exists on either side of the filter is taken over a duration of one hour. The tests are carried out at a temperature of 125° C. and under a pressure of 45 bars. The results obtained are presented in the Table 6 hereinbelow.

TABLE 6

Results of the Tube blocking tests

| effective concentration in the tube (mg/L) | increase in pressure over one hour (psi) | deposits observed |
|---|---|---|
| bare filter | N/A | none |
| FL1-PC4Si not aged | | |
| 0 | 1.6 | large quantity of ZnS |
| 3 | 0.2 | low quantity of Zns |
| 5 | 0.2 | low quantity of Zns |
| 10 | 0.2 | traces of ZnS |
| FL1-PC4Si aged | | |
| 0 | 1.7 | large quantity of ZnS |
| 1 | 0.8 | traces of ZnS |
| 3 | 0.2 | traces of ZnS |
| 5 | 0.2 | traces of ZnS |

This example shows that the thermal ageing did not affect the effectiveness of the deposit inhibitor FL1-PC4Si.

Example 12: Evaluation of the Inhibiting Effect of Carbonate by the Tube Blocking Test of the IDOS150 (Bellassol S50) and IDOS150-PC4Si In order to test the inhibiting power of the two formulations a blocking test was set up. It consists in measuring the time required for a blocking of the filter via a deposit of metal salts is produced.

The results of this test show that at concentrations of 1 ppm and of 5 ppm the two formulations fulfil their roles of an inhibitor. It is observed moreover that the two formulations are close in terms of effectiveness.

Example 13 Evaluation of the Absorption/Desorption of the Inhibitors Belassol S50 (Water Additives) and NanoBellassol S50-PC4Si on a Sample of Sand This entails evaluating the capacity of the inhibiting formulations to be adsorbed physically or chemically over the mineral surface of the porous medium modelled by a sample of sand in the case at hand. This adsorption can be a function of several variables (Concentrations, pH, temperature, etc.). The inhibitor is then released via desorption. At equilibrium, the static adsorption Γ (mg/g) is represented by the following equation:

$$\Gamma = \frac{(C_0 - C_{eq})V}{m}$$

Where $C_0$ is the initial concentration of the inhibitor in mg/L. V is the volume of the inhibitor solution in L. $C_{eq}$ is the concentration of the inhibitor in equilibrium in mg/L and m is the mass of the porous medium.

Figure 2:
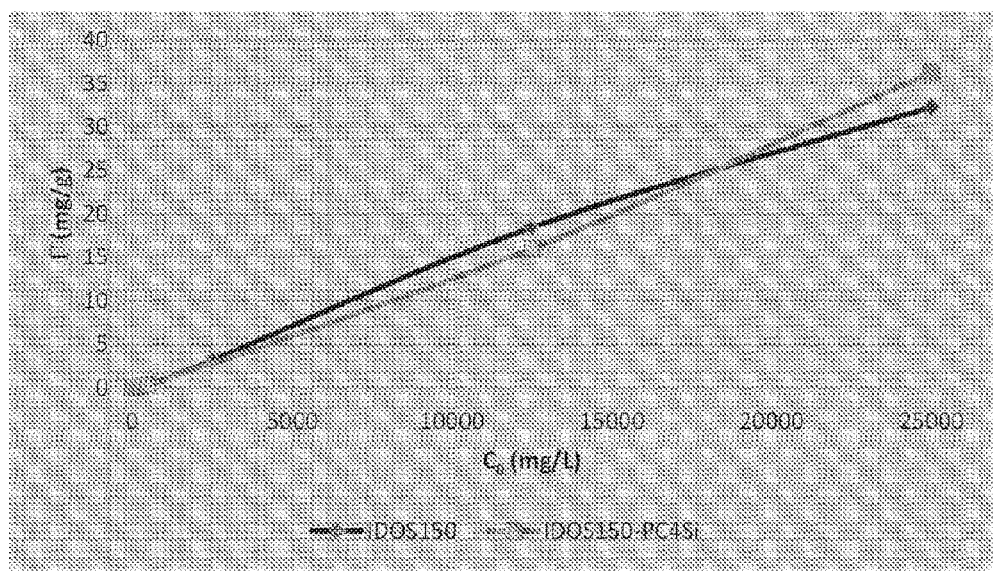
FIG. 2 is a graph showing static adsorption on a sand sample as a function of the initial concentration of inhibitor.

A series of adsorption experiments on sand with two inhibitors was carried out. The two formulations tested are that of IDOS 150 (Belassol S50) described in example 5 and that of IDOS150-PC4Si described in example 6. The mean diameter in volume measured by laser granulometry is 210 nm±10 nm. The results obtained are provided in table 7 and FIG. 2.

TABLE 7

| IDOS150 $C_0$ (mg/L) | IDOS150-PC4Si $C_0$ (mg/L) IDOS150 | $C_0$ (mg/L) Si | IDOS150 | | IDOS150-PC4Si | |
|---|---|---|---|---|---|---|
| | | | $C_{eq}$ (mg/L) | $\Gamma$ (mg/g) | $C_{eq}$ (mg/L) | $\Gamma$ (mg/g) |
| 0 | 0 | 0 | 0 | 0 | 0 | 0 |
| 250 | 250 | 7.5 | 121.5030565 | 0.192745415 | 113.1596752 | 0.205260487 |
| 500 | 500 | 15 | 318.4133682 | 0.272379948 | 279.7862917 | 0.330320563 |
| 12500 | 12500 | 150 | 205.6291528 | 18.44155627 | 1837.862013 | 15.99320698 |
| 25000 | 25000 | 300 | 3470.889381 | 32.29366593 | 830.2890173 | 36.25456647 |

The results indicate that the Nanoinhibitor IDOS 150-PC4Si is adsorbed and is desorbed on the sand in the same way as the inhibitor IDOS150 alone.

Example 14: Test of Simple Permeation

Figure 5:
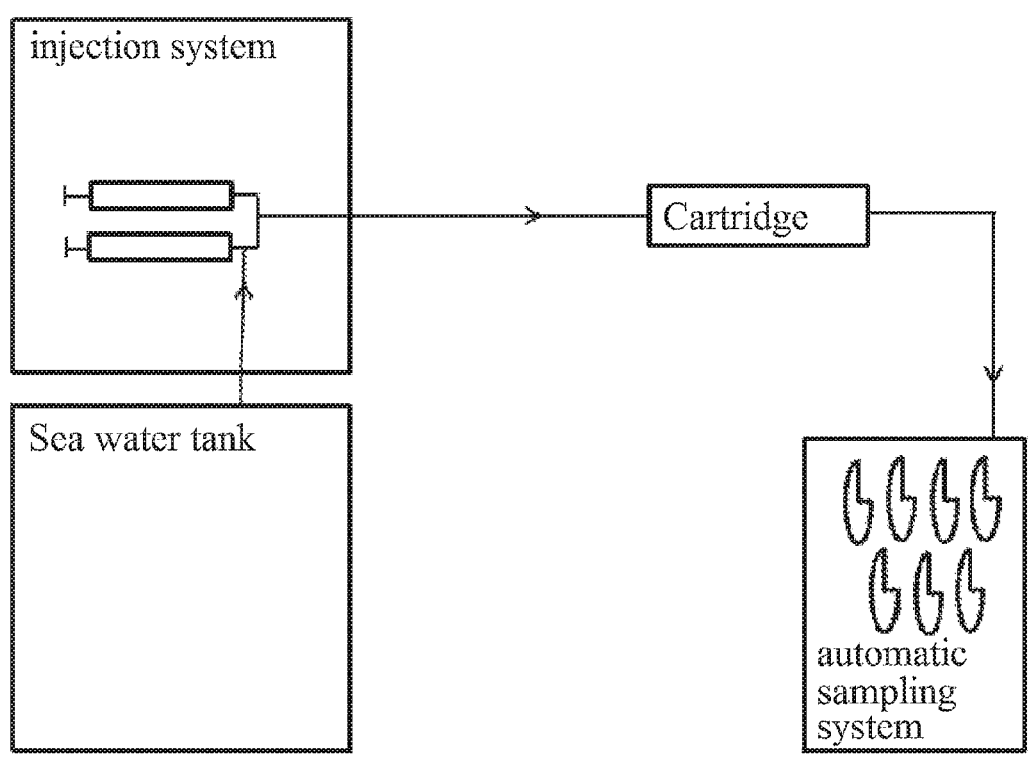
FIG. 5 is a diagram showing the principle of the permeation tests.

In order to test the affinity of the inhibitors with the rock, a so-called "simple permeation" test was developed. The latter consists in injecting into a cartridge of rock a synthetic solution of sea water containing the inhibitor in question. Once the cartridge is filled with the inhibiting solution, sea water alone is injected and the outlet of the inhibitor is monitored. The diagram of the device is provided in FIG. 5.

The cartridge in question is comprised of a cylindrical core of rock encased in a PVC tube and linked to the latter by an epoxy resin. The bases are perforated on either side of the cartridge allowing a dual syringe pump system to ensure a continuous flow through the system at a variable flow rate.

The presence of the inhibitor at the outlet is detected by complexation of free terbium ion by the latter. Once chelated, the phosphorescence of the Terbium ions is substantially exalted.

The first step consists in carrying out the circulation of sea water alone at a height of about 100 times the porous volume of the core of rock through (300 mL/h). Once washed in this way, the cartridge is ready to receive the inhibitor.

Figure 4:
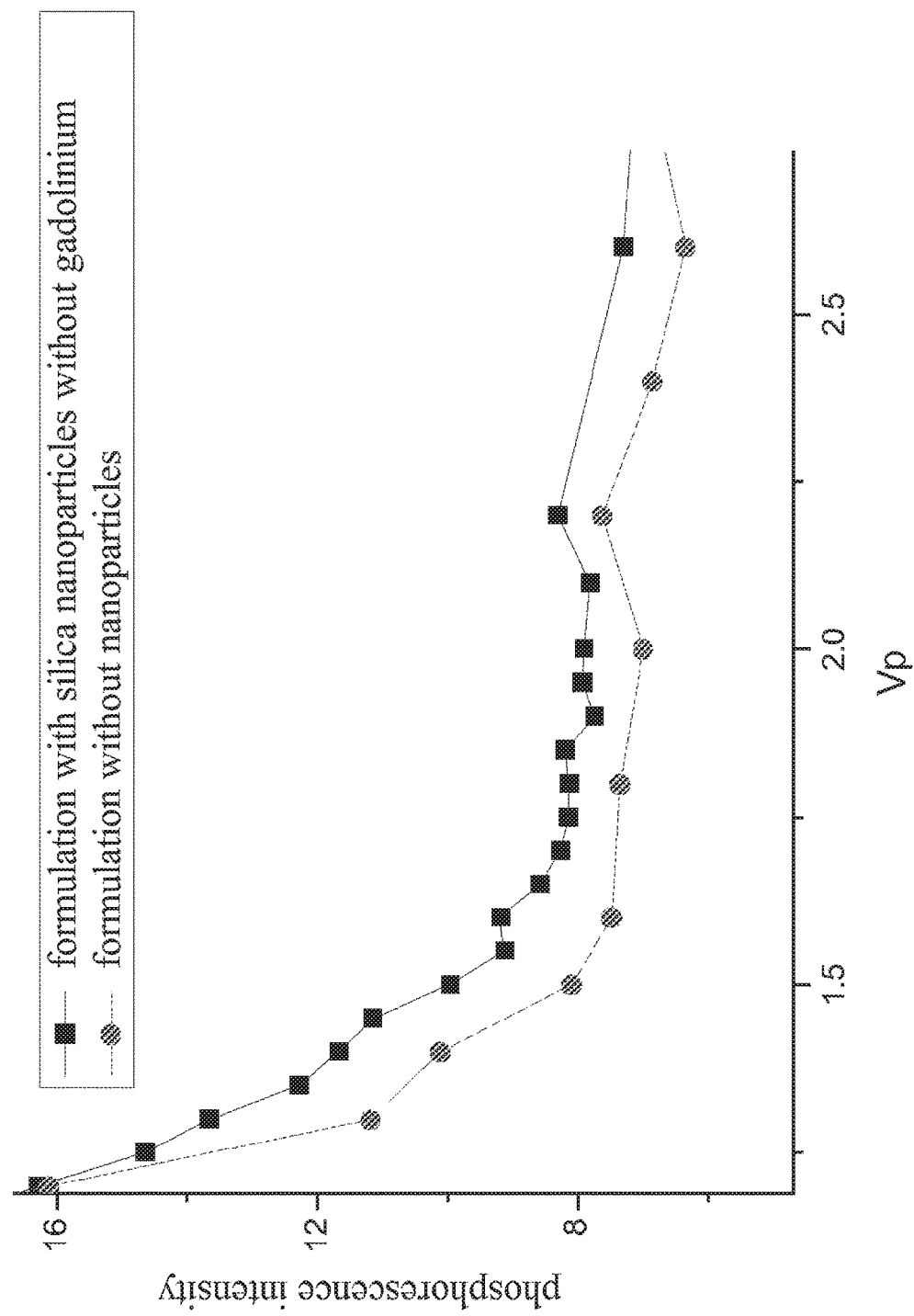
FIG. 4 is a graph showing normalized phosphorescence intensity with an inhibitor formulation comprising nanoparticles without gadolinium (top curve) and without nanoparticles (bottom curve) at the outlet of the simple permeation device.

A first test was conducted using a solution of TP8106G at 1% by weight of inhibitor with or without silica nanoparticles without gadolinium (this is more precisely a solution A/20; see example 16 and 17 for the synthesis of the nanoparticles and the preparation of the formulation of inhibitor with nanoparticles). The inhibiting solutions are injected in diluted form into the sea water (solution at 2% by weight): 5 times the porous volume of this solution has passed through the rock (at a flow rate of 500 mL/h). The injecting of sea water alone is then resumed (300 mL/h) until it is no longer possible to detect the inhibitor in the samples taken automatically at regular intervals of time at the outlet of the core. The results can be seen in FIG. 4. A more substantial retention is observed for the nanoparticulate formulation of the inhibiting solution (squares) as for the conventional formulation (circles).

Figure 3:
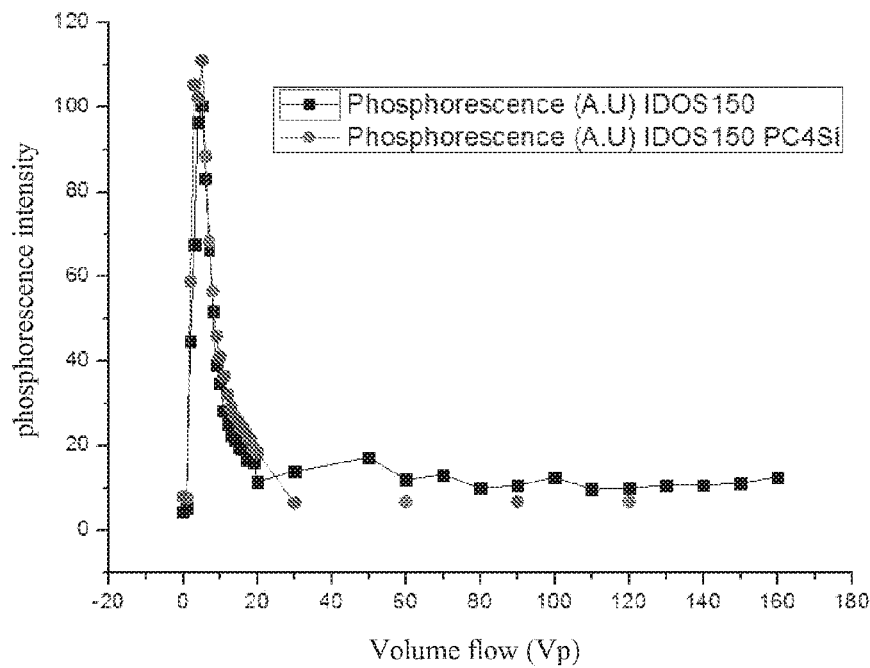
FIG. 3 is a graph showing (A) the intensity of phosphorescence and (B) the concentration, obtained with the single polymeric inhibitor (square) or in the form of nanoinhibitors (circles) according to the volume injected.
Figure 3:
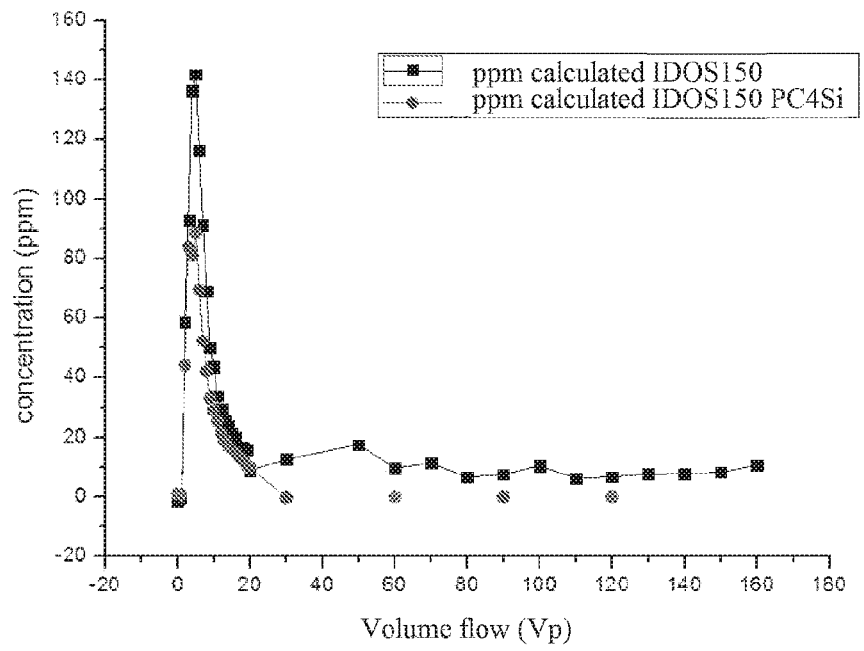

The same observation is established for a formulation with PC4Si or without nanoparticles of the inhibitor IDOS 150 (FIGS. 3A and 3B).

Example 15: Permeation Test

In order to test the affinity of the various inhibiting formulations with the rock, a so-called "permeation" test has been developed. The block diagram is provided in FIG. 5. The difference with the simple permeation test in example 14 is a temperature maintained here at 195° C. The permeability of the device is between 400 and 700 mD.

Figure 6:
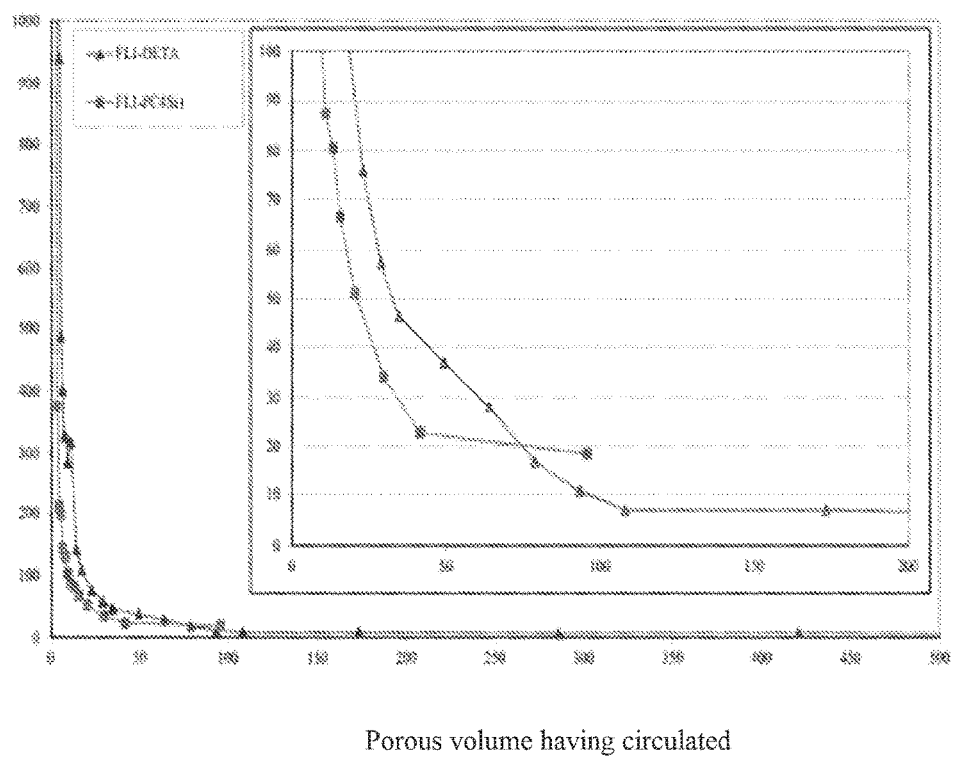
FIG. 6 is a graph showing the amount of inhibitor measured at the outlet of the permeation device according to the volume injected.

The results of this test are shown in FIG. 6 and show a more substantial delivery of inhibitors over a long time for the Nanoinhibitor formulation.

Example 16: Synthesis of Silica Cores without Gadolinium

The synthesis of silica nanoparticles without gadolinium is carried out via simple mixture of precursors of the organosilane type: (3-Aminopropyl)triethoxysilane and tetraethyl ortho silicate (APTES and TEOS) in water. TEOS is added under strong stirring alone then after about 10 minutes APTES is also added with the stirring being maintained. The proportions of the two reagents can be varied. The solution is then kept under stirring for one night. No step of purification is carried out afterwards.

Figure 7:
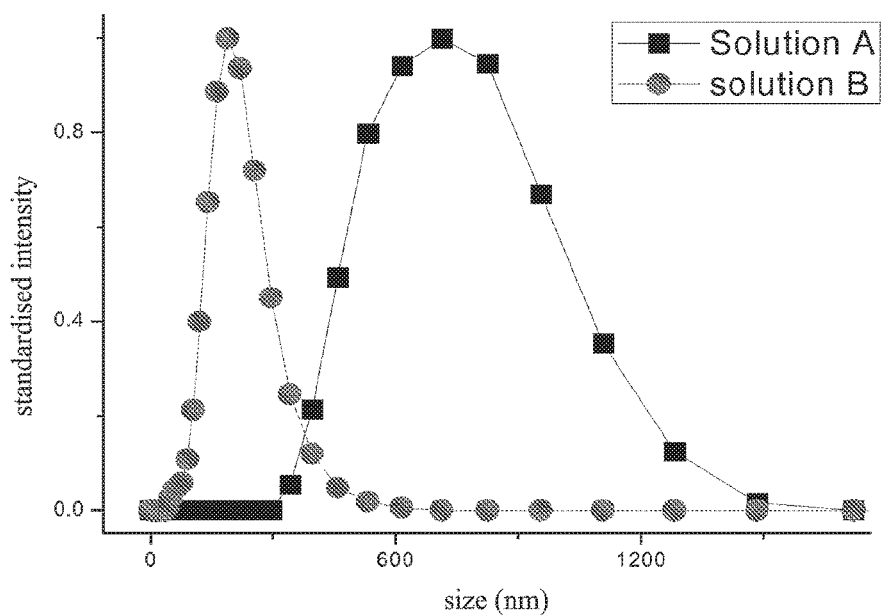
FIG. 7 is a graph showing analysis by DLS of the size of the silica nanoparticles without gadolinium.

FIG. 7 provides the signature in dynamic diffusion of the light (DLS) of the nanoparticles at the end of synthesis for proportions 50/50 in mass of APTES and of TEOS. The solution A (squares) is obtained by adding 5 mL of TEOS and 5 mL of APTES to 1 L of pure water. The solution B (circles) by adding 1 mL of TEOS and 1 L of APTES to 1 L of pure water. The mean sizes obtained are respectively 720 nm and 190 nm.

Example 17: Preparation of Solution of Nanoinhibitors TP8106G with Nanoparticles without Gadolinium The solutions A and B obtained in example 16 are diluted by a given factor of dilution and left under stirring for a duration between 1 h and 72 h. The solutions obtained as such are then mixed in equal proportions by a commercial solution of TP8106G which is itself diluted by 2. The solutions finally obtained are left under stirring for 24 h then are analysed via DLS.

As such the 50/50 mixture in volume of the solution A diluted by 100 and allowed to mature for one hour with the solution of TP8106G diluted by 2 gives a mean size of 249 nm after 24 h of mixing.

The 50/50 mixture in volume of the solution B diluted by 10 and left to mature for one hour with the solution of TP8106G diluted by 2 gives a mean size of 491 nm after 24 h of mixing.

The invention claimed is:

1. Nanoparticles wherein they each include
   (i) a polyorganosiloxane (POS) matrix comprising at least 10% (mol/mol) of free amine groups per silica atom;
   (ii) at least one polymeric deposit inhibitor during the extraction of gas or oil.

2. Nanoparticles according to claim 1, wherein the mass of the deposit inhibitors represents more than 80% of the total mass of each nanoparticle.

3. Nanoparticles according to claim 1, wherein they include a polymeric deposit inhibitor chosen from polymers or copolymers containing at least one of the following functions:
   carboxylic polyacids,
   sulphonic acid polymers,
   phosphates or phosphonates,
   polyphosphinocarboxylic acids,
   amide functions.

4. Nanoparticles according to claim 1, wherein they include a polymeric deposit inhibitor chosen from copolymers of styrene sulphonic acid and (poly)carboxylic acid and copolymers of styrene sulphonic and (poly) amido-amine.

5. Nanoparticles according to claim 1, wherein they include furthermore phosphonates.

6. Nanoparticles according to claim 1, wherein they have a mean diameter less than 1 μm.

7. Nanoparticles according to claim 1, wherein the polyorganosiloxane matrix is functionalised by —R groups, by covalence with a base of silanes Si—R bonds at the surface and from hydrophilic compounds, chosen from: aminopropyl, N-(2-aminoethyl-3-aminopropyl; Bis(2-hydroxyethyl)-3-Aminopropyl; N-propyl-N, N, N-trimethylamonium; N-Propyl-N, N, N-tri-n-butyl ammonium; and 11-amino-undecyl, N-(2-aminoethyl)-11 amino-undecyl.

8. Nanoparticles according to claim 1 wherein they do not include a lanthanide oxide core.

9. Nanoparticles according to claim 1 wherein the deposit inhibitors are connected to the polyorganosiloxane matrix by non-covalent electrostatic connections.

10. Method for obtaining nanoparticles according to claim 1 which comprises the following steps:
    a. optionally synthesising a core with a lanthanide oxide base,
    b. coating the cores of the step (a) with polyorganosiloxane (POS) or preparing a nanoparticle polyorganosiloxane, by implementing a sol/gel technique of hydrolysis-condensation of silicic and alkoxysilane species, in the presence of a base or an acid;
    c. overcoating the nanoparticles obtained in step (b) by bringing these coated cores or polyorganosiloxane nanoparticles of the step (b) in contact with a solution of polymeric deposit inhibitors in the presence of a non-aqueous solvent,
    d. optionally purification of the nanoparticles; and
    e. optionally dissolving the cores of lanthanides oxides of the nanoparticles of the step (b) or overcoated nanoparticles of the step (c) by putting them in the presence of a pH modifying agent and/or of a chelator able to complex all or a portion of the lanthanide cations, in such a way that the diameter of the nanoparticles without the overcoating is reduced to a value between 1 and 20 nm;
    the steps (c), (d), and (e) are able to be carried out in a different order or at the same time.

11. Suspension of nanoparticles according to claim 1 and/or obtained by the method for obtaining nanoparticles comprising the following steps:
    a. optionally synthesising a core with a lanthanide oxide base,
    b. coating the cores of the step (a) with polyorganosiloxane (POS) or preparing a nanoparticle polyorganosiloxane, by implementing a sol/gel technique of hydrolysis-condensation of silicic and alkoxysilane species, in the presence of a base or an acid;
    c. overcoating the nanoparticles obtained in step (b) by bringing these coated cores or polyorganosiloxane nanoparticles of the step (b) in contact with a solution of polymeric deposit inhibitors in the presence of a non-aqueous solvent,
    d. optionally purification of the nanoparticles; and
    e. optionally dissolving the cores of lanthanides oxides of the nanoparticles of the step (b) or overcoated nanoparticles of the step (c) by putting them in the presence of a pH modifying agent and/or of a chelator able to complex all or a portion of the lanthanide cations, in such a way that the diameter of the nanoparticles without the overcoating is reduced to a value between 1 and 20 nm;
    the steps (c), (d), and (e) are able to be carried out in a different order or at the same time.

12. Injection liquid for inhibiting or slowing down the formation of deposits during the exploitation of gas or oil, it comprises nanoparticles according to claim 1 and/or, nanoparticles obtained by the method for obtaining nanoparticles comprising the following steps:
    a. optionally synthesising a core with a lanthanide oxide base,
    b. coating the cores of the step (a) with polyorganosiloxane (POS) or preparing a nanoparticle polyorganosiloxane, by implementing a sol/gel technique of hydrolysis-condensation of silicic and alkoxysilane species, in the presence of a base or an acid;
    c. overcoating the nanoparticles obtained in step (b) by bringing these coated cores or polyorganosiloxane nanoparticles of the step (b) in contact with a solution of polymeric deposit inhibitors in the presence of a non-aqueous solvent,
    d. optionally purification of the nanoparticles; and
    e. optionally dissolving the cores of lanthanides oxides of the nanoparticles of the step (b) or overcoated nanoparticles of the step (c) by putting them in the presence of a pH modifying agent and/or of a chelator able to complex all or a portion of the lanthanide cations, in such a way that the diameter of the nanoparticles without the overcoating is reduced to a value between 1 and 20 nm;
    the steps (c), (d), and (e) are able to be carried out in a different order or at the same time;
    and/or the suspension of nanoparticles.

13. Method for inhibiting or slowing down the formation of mineral deposits or sulphur deposits, during extraction of gas or oil, said method comprising injecting, into a wellbore, a subterranean formation, or an oil or gas well, a fluid containing nanoparticles according to claim 1 and/or obtained by the method for obtaining nanoparticles comprising the following steps:

a. optionally synthesising a core with a lanthanide oxide base, b. coating the cores of the step (a) with polyorganosiloxane (POS) or preparing a nanoparticle polyorganosiloxane, by implementing a sol/gel technique of hydrolysis-condensation of silicic and alkoxysilane species, in the presence of a base or an acid;

c. overcoating the nanoparticles obtained in step (b) by bringing these coated cores or polyorganosiloxane nanoparticles of the step (b) in contact with a solution of polymeric deposit inhibitors in the presence of a non-aqueous solvent, d. optionally purification of the nanoparticles; and e. optionally dissolving the cores of lanthanides oxides of the nanoparticles of the step (b) or overcoated nanoparticles of the step (c) by putting them in the presence of a pH modifying agent and/or of a chelator able to complex all or a portion of the lanthanide cations, in such a way that the diameter of the nanoparticles without the overcoating is reduced to a value between 1 and 20 nm;

the steps (c), (d), and (e) are able to be carried out in a different order or at the same time.

14. The method according to claim 13, wherein the oil or gas well is operated at more than 10 MPa.

15. The method according to claim 13, wherein the injection is of the squeeze type.

* * * * *